US011710815B2

United States Patent
Chae et al.

(10) Patent No.: US 11,710,815 B2
(45) Date of Patent: Jul. 25, 2023

(54) NEGATIVE ELECTRODE FOR LITHIUM SECONDARY BATTERY, LITHIUM SECONDARY BATTERY COMPRISING THE SAME, AND METHOD OF PREPARING THE NEGATIVE ELECTRODE

(71) Applicant: LG Chem, Ltd., Seoul (KR)

(72) Inventors: Oh Byong Chae, Daejeon (KR); Sang Wook Woo, Daejeon (KR); Eun Kyung Kim, Daejeon (KR); Yoon Ah Kang, Daejeon (KR); Jun Hyuk Song, Daejeon (KR)

(73) Assignee: LG Energy Solution, Ltd.

( * ) Notice: Subject to any disclaimer, the term of this patent is extended or adjusted under 35 U.S.C. 154(b) by 267 days.

(21) Appl. No.: 16/494,458

(22) PCT Filed: Jul. 11, 2018

(86) PCT No.: PCT/KR2018/007878
§ 371 (c)(1),
(2) Date: Sep. 16, 2019

(87) PCT Pub. No.: WO2019/013557
PCT Pub. Date: Jan. 17, 2019

(65) Prior Publication Data
US 2020/0295358 A1    Sep. 17, 2020

(30) Foreign Application Priority Data

Jul. 12, 2017 (KR) .................... 10-2017-0088557

(51) Int. Cl.
| | |
|---|---|
| *H01M 4/04* | (2006.01) |
| *H01M 4/36* | (2006.01) |
| *H01M 4/38* | (2006.01) |
| *H01M 4/48* | (2010.01) |
| *H01M 4/62* | (2006.01) |
| *H01M 10/052* | (2010.01) |
| *H01M 4/1395* | (2010.01) |
| *H01M 4/134* | (2010.01) |
| *H01M 4/02* | (2006.01) |

(52) U.S. Cl.
CPC ......... *H01M 4/0445* (2013.01); *H01M 4/134* (2013.01); *H01M 4/1395* (2013.01); *H01M 4/366* (2013.01); *H01M 4/386* (2013.01); *H01M 4/483* (2013.01); *H01M 4/62* (2013.01); *H01M 4/622* (2013.01); *H01M 10/052* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2010/0216027 A1* | 8/2010 | Fujii | H01G 11/52 429/246 |
| 2012/0070742 A1 | 3/2012 | Chung et al. | |
| 2013/0177798 A1 | 7/2013 | Ueda | |
| 2014/0057173 A1 | 2/2014 | Jeong et al. | |
| 2015/0243997 A1* | 8/2015 | Park | H01M 4/622 429/127 |
| 2015/0357628 A1* | 12/2015 | Li | H01M 4/1395 252/182.1 |
| 2016/0141608 A1 | 5/2016 | Ryu et al. | |
| 2016/0301037 A1 | 10/2016 | Durand et al. | |
| 2017/0179469 A1 | 6/2017 | Jiang et al. | |

FOREIGN PATENT DOCUMENTS

| | | | |
|---|---|---|---|
| CN | 1820846 A | | 8/2006 |
| CN | 202231097 U | | 5/2012 |
| CN | 103081209 A | | 5/2013 |
| CN | 106058087 A | | 10/2016 |
| JP | 2001015172 A | * | 1/2001 |
| JP | 2010160983 A | | 7/2010 |
| KR | 20100127730 A | | 12/2010 |
| KR | 20140009927 A | | 1/2014 |
| KR | 20140046496 A | | 4/2014 |
| KR | 20160023751 | | 3/2016 |
| KR | 20160040020 | | 4/2016 |
| KR | 20160057813 | | 5/2016 |
| KR | 20170018378 A | | 2/2017 |

OTHER PUBLICATIONS

Machine translation of JP 2001-015172 A (Year: 2001).*
Extended European Search Report with Written Opinion for Application No. 18831945.3 dated Mar. 27, 2020, 7 pages.
Search report from International Application No. PCT/KR2018/007878, dated Feb. 15, 2019.
Search Report dated Jan. 20, 2022 from the Office Action for Chinese Application No. 201880017659.4 dated Jan. 29, 2022, 3 pages.

* cited by examiner

*Primary Examiner* — Robert S Carrico
(74) *Attorney, Agent, or Firm* — Lerner David LLP

(57) ABSTRACT

The present invention relates to a negative electrode for a secondary battery which comprises a negative electrode collector, a negative electrode active material layer formed on the negative electrode collector, and a lithium metal layer, wherein an adhesive layer is disposed between the negative electrode active material layer and the lithium metal layer, and the lithium metal layer comprises lithium and metal oxide in a weight ratio of 50:50 to 99:1.

5 Claims, No Drawings

NEGATIVE ELECTRODE FOR LITHIUM SECONDARY BATTERY, LITHIUM SECONDARY BATTERY COMPRISING THE SAME, AND METHOD OF PREPARING THE NEGATIVE ELECTRODE

CROSS-REFERENCE TO RELATED APPLICATIONS

The present application is a national phase entry under 35 U.S.C. § 371 of International Application No. PCT/KR2018/007878, filed on Jul. 11, 2018, which claims priority from Korean Patent Application No. 10-2017-0088557, filed on Jul. 12, 2017, the disclosures of which are incorporated herein by reference.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

A metal oxide, such as $LiCoO_2$, $LiMnO_2$, $LiMn_2O_4$, or $LiCrO_2$, is being used as a positive electrode active material constituting a positive electrode of a lithium secondary battery, and metallic lithium, a carbon-based material, such as graphite or activated carbon, or a material, such as silicon oxide (SiOx), is being used as a negative electrode active material constituting a negative electrode. Among these negative electrode active materials, the metallic lithium has initially been mainly used, but, recently, the carbon-based material has been mainly used, because a phenomenon occurs in which the battery is destroyed by damage of a separator which is caused by the growth of lithium atoms on the surface of the metal lithium as charge and discharge cycles proceed. However, with respect to the carbon-based material, it is disadvantageous in that its capacity is small because its theoretical capacity is only about 400 mAh/g, and thus, various studies have been conducted to replace the carbon-based material by using silicon (Si) with high theoretical capacity (4,200 mAh/g) as a negative electrode active material.

Charge and discharge of the lithium secondary battery is performed while a process of intercalating and deintercalating lithium ions from the positive electrode active material of the positive electrode into and out of the negative electrode active material of the negative electrode is repeated.

Theoretically, lithium intercalation and deintercalation reactions in the negative electrode active material are completely reversible, but, actually, more lithium is consumed than theoretical capacity of the negative electrode active material, and only a portion of the lithium is recovered during discharge. Thus, after a second cycle, a smaller amount of lithium ions is intercalated during charge, but most of the intercalated lithium ions are deintercalated during discharge. Thus, a difference in capacity between the first charge and discharge reactions is referred to as an irreversible capacity loss, and, since a commercially available lithium secondary battery is prepared in a state in which lithium ions are supplied from the positive electrode and lithium is not present in the negative electrode, it is important to minimize the irreversible capacity loss during initial charge and discharge.

It is known that this initial irreversible capacity loss is mainly caused by an electrolyte decomposition reaction on a surface of the negative electrode active material, and an SEI (Solid Electrolyte Interface) is formed on the surface of the negative electrode active material by an electrochemical reaction due to the electrolyte decomposition. Since a large amount of lithium ions is consumed in the formation of the SEI, there is a limitation in that the irreversible capacity loss is caused, but the SEI formed at an initial stage of charging may prevent a reaction of the lithium ions with the negative electrode or other materials during charge and discharge and may act as an ion tunnel that only passes the lithium ions, and thus, the SEI contributes to the improvement of cycle characteristics of the lithium secondary battery by suppressing the further electrolyte decomposition reaction.

Therefore, there is a need for a method to improve the initial irreversibility caused by the formation of the SEI, and one of such methods comprises a method of allowing a side reaction generated during the first charge to occur in advance by performing pre-lithiation before the preparation of the lithium secondary battery. As described above, in a case in which the pre-lithiation is performed, when the actually prepared secondary battery is charged and discharged, since the first cycle is performed in a state in which the irreversibility is reduced accordingly, it is advantageous in that the initial irreversibility may be reduced.

A conventional pre-lithiation method, for example, may comprise a method of depositing lithium on a negative electrode or a method of directly contacting the negative electrode with lithium. However, the method of depositing lithium is disadvantageous in that, in order to deposit lithium, it is expensive to set an apparatus for deposition and, in mass production, processability is poor due to the time required. Since the method of directly contacting the negative electrode with lithium requires a process of wetting the negative electrode by immersing the negative electrode in an electrolyte solution before the contact with the lithium, time is not only required, but also the electrode immersed in the electrolyte solution has a problem in adhesion.

Accordingly, there is a need to develop a new negative electrode for a lithium secondary battery in which more effective pre-lithiation may be performed.

DISCLOSURE OF THE INVENTION

Technical Problem

An aspect of the present invention provides a negative electrode for a lithium secondary battery in which pre-lithiation may be effectively performed.

Another aspect of the present invention provides a lithium secondary battery comprising the negative electrode for a lithium secondary battery.

Technical Solution

According to an aspect of the present invention, there is provided a negative electrode for a lithium secondary battery comprising: a negative electrode collector; a negative electrode active material layer formed on the negative electrode collector; and a lithium metal layer, wherein an adhesive layer is disposed between the negative electrode active material layer and the lithium metal layer, and the lithium metal layer comprises lithium and metal oxide in a weight ratio of 50:50 to 99:1.

According to another aspect of the present invention, there is provided a lithium secondary battery comprising the negative electrode for a lithium secondary battery.

Advantageous Effects

Since pre-lithiation may be effectively performed on a negative electrode for a lithium secondary battery according to the present invention in an easy way and irreversible capacity of the negative electrode is reduced, high capacity characteristics may be exhibited.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A negative electrode for a lithium secondary battery according to the present invention comprises a negative electrode collector; a negative electrode active material layer formed on the negative electrode collector; and a lithium metal layer, wherein an adhesive layer is disposed between the negative electrode active material layer and the lithium metal layer, and the lithium metal layer comprises lithium and metal oxide in a weight ratio of 50:50 to 99:1.

In the negative electrode for a lithium secondary battery according to an embodiment of the present invention, the negative electrode active material is not particularly limited, but may have large initial irreversible capacity and may comprise a silicon-based negative electrode active material. Also, in addition to the silicon-based negative electrode active material, the negative electrode active material may typically comprise a carbon material capable of intercalating and deintercalating lithium ions, lithium metal, or tin together.

The silicon-based negative electrode active material, for example, may comprise at least one selected from the group consisting of silicon (Si), silicon oxide particles ($SiO_x$, $0<x\leq2$), a Si-metal alloy, and an alloy of Si and silicon oxide particles ($SiO_x$, $0<x\leq2$), and the silicon oxide particles may be a composite ($SiO_x$, $0<x\leq2$) composed of crystalline $SiO_2$ and amorphous Si.

Since the silicon-based negative electrode active material undergoes a large volume change during charge and discharge and has a large irreversible capacity due to severe surface side effects during initial charge and discharge, benefits obtained by performing pre-lithiation are greater.

Both low crystalline carbon and high crystalline carbon may be used as the carbon material, typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

In the negative electrode for a lithium secondary battery according to the embodiment of the present invention, the negative electrode active material layer may have a thickness of 10 μm to 100 μm and may specifically have a thickness of 50 μm to 80 μm.

The lithium metal layer is a layer comprising lithium and metal oxide, wherein it may be a thin film, a film, or a coating layer which comprises lithium and metal oxide. An adhesive layer is disposed between the negative electrode active material layer and the lithium metal layer.

Since the lithium metal included in the lithium metal layer may supply lithium ions to the negative active material layer, it is possible to compensate for the reduction of lithium ions generated by initial irreversibility of the lithium secondary battery comprising the same. The lithium metal may be completely consumed in an initial activation charge process of the lithium secondary battery comprising the same.

The lithium metal layer may have a thickness of 1,000 nm to 7,500 nm, particularly 1,250 nm to 7,500 nm, and more particularly 1,500 nm to 5,000 nm. In a case in which the lithium metal layer satisfies the above thickness range, the lithium metal may be completely consumed in the initial activation charge process, i.e., a pre-lithiation process of the lithium secondary battery while the lithium metal layer may comprise the lithium metal in an amount capable of compensating for the irreversibility of the negative electrode for a lithium secondary battery.

The lithium metal layer may comprise lithium and metal oxide in a weight ratio of 50:50 to 99:1, particularly 80:20 to 95:5, and more particularly 87:13 to 92:8.

The metal oxide may exhibit an effect of preventing oxidation of the lithium metal which is easily oxidized when exposed to moisture and oxygen and has an effect of increasing safety of the lithium secondary battery. In a case in which the lithium and the metal oxide satisfy the above weight ratio, the metal oxide may have the effect of preventing the oxidation of the lithium metal and stabilizing charge and discharge on a surface of the negative electrode while the lithium metal layer may comprise the lithium metal in an amount capable of appropriately compensating for the irreversibility of the negative electrode for a lithium secondary battery within the thickness range.

The metal oxide may comprise at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, iron oxide, manganese oxide, vanadium oxide, cobalt oxide, nickel oxide, and tantalum pentoxide, and may specifically comprise at least one selected from the group consisting of aluminum oxide, chromium trioxide, zirconium dioxide, and tantalum pentoxide.

The adhesive layer is disposed between the negative electrode active material layer and the lithium metal layer so that the adhesive layer allows the lithium metal layer to be able to be attached to the negative electrode active material layer.

In the negative electrode for a lithium secondary battery according to the embodiment of the present invention, since the lithium metal layer is attached to the negative electrode active material layer through the adhesive layer, a separate apparatus for depositing lithium on the negative electrode active material layer is not required and the lithium metal layer may be attached to the negative electrode active material layer in a shorter time than the time required for the deposition, and thus, it has a process advantage in the preparation of the lithium secondary battery.

The adhesive layer may comprise an organic-based binder, the organic-based binder may comprise a polymer of acrylic monomers, such as lithium polyacrylate, or carboxymethyl cellulose (CMC), and the adhesive layer may specifically comprise a polymer of acrylic monomers. The acrylic monomer may comprise at least one selected from the group consisting of methyl acrylate, vinyl acrylate, ethyl acrylate, acrylonitrile, butyl methyl acrylate, acrylic acid, and acrylamide.

The adhesive layer may comprise an ionic compound, and the ionic compound may diffuse lithium in the lithium metal layer into the negative electrode active material layer. Thus, since the separate process of pre-lithiation by directly contacting the negative electrode active material layer with lithium is not required, a process of wetting the negative electrode by immersing the negative electrode in an electrolyte solution, which is required in the process of pre-lithiation by directly contacting the negative electrode active material layer with lithium, is not necessary, and thus, a reduction in adhesion of the electrode due to the immersion in the electrolyte solution may be prevented.

Further, since the separate process of pre-lithiation by directly contacting the negative electrode active material layer with lithium is not required, a process of wetting the negative electrode by immersing the negative electrode in an electrolyte solution, which is required in the process of pre-lithiation by directly contacting the negative electrode active material layer with lithium, is not necessary, and thus, a reduction in adhesion of the electrode due to the immersion in the electrolyte solution may be prevented.

Also, the adhesive layer may comprise an organic-based binder comprising an alkali metal salt. For example, the adhesive layer may comprise a polymer of an alkali metal salt of acrylic monomer, and the alkali metal salt of acrylic monomer may comprise a lithium salt, a sodium salt, and a potassium salt of the above-described acrylic monomer. In a case in which the adhesive layer comprises the organic-based binder comprising an alkali metal salt, since a lithium-ion diffusion effect from the lithium metal layer is more excellent, pre-lithiation efficiency of the negative electrode is increased and initial efficiency of the lithium secondary battery comprising the same may be further improved.

The adhesive layer may have a thickness of 100 nm to 10,000 nm, particularly 200 nm to 1,000 nm, and more particularly 300 nm to 500 nm.

In a case in which the thickness of the adhesive layer is within the above range, since the lithium of the lithium metal layer may smoothly pass through the adhesive layer while the lithium metal layer is firmly attached to the negative electrode active material layer, the lithium may be allowed to appropriately diffuse into the negative electrode active material layer through the subsequent pre-lithiation.

The negative electrode for a lithium secondary battery according to the embodiment of the present invention may be prepared by a preparation method which comprises the steps of: (1) forming a negative electrode active material layer on a negative electrode collector; (2) coating an organic binder on the negative electrode active material layer to form an adhesive layer; and (3) attaching a lithium metal layer to the adhesive layer.

In step (1), a negative electrode active material layer comprising a carbon-based active material is formed on a negative electrode collector as in a conventional method. For example, the negative electrode may be prepared according to the method of forming the negative electrode active material layer on the negative electrode collector in which, after a slurry is prepared by mixing and stirring the negative electrode active material with a solvent as well as a binder and a conductive agent, if necessary, the negative electrode collector is coated with the slurry, compressed, and then dried.

The negative electrode active material layer may have a porosity of 10% to 60%, particularly 20% to 40%, and more particularly 25% to 35%.

The negative electrode collector is generally formed to a thickness of 3 µm to 500 µm. The negative electrode collector is not particularly limited as long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, similar to a positive electrode collector, microscopic irregularities may be formed on the surface of the collector to improve the adhesion of the negative electrode active material, and the negative electrode collector may be used in various shapes such as a film, a sheet, a foil, a net, a porous body, a foam body, a non-woven fabric body, and the like.

In step (2), an organic binder is coated on the negative electrode active material layer to form an adhesive layer.

The organic binder may be coated in the form of a binder solution which is mixed in an organic solvent such as N-methylpyrrolidone (NMP), dimethylformamide (DMF), acetone, dimethylacetamide, examples of the coating method may be spin coating, die coating, gravure coating, micro-gravure coating, comma coating, roll coating, dip coating, or spray coating, and, specifically, the spin coating or spray coating may be used.

In step (3), a lithium metal layer is attached to the adhesive layer.

The lithium metal layer may be attached by a method in which a thin film comprising lithium and metal oxide is first prepared and the thin film is directly attached to the adhesive layer, or a method of forming the lithium metal layer on the adhesive layer by a method such as coating or application. In a case in which the thin film comprising lithium and metal oxide is first prepared, the thin film comprising lithium and metal oxide is formed on a separate substrate, and the thin film may then be moved on the adhesive layer and attached. For example, the lithium metal layer may be prepared by depositing or coating a mixture of lithium metal and metal oxide on the adhesive layer or a separate substrate.

The deposition may be performed by physical vapor deposition (PVD) comprising sputtering, E-Beam evaporation, or thermal evaporation, or chemical vapor deposition (CVD), and the coating may be performed by drop coating, melting coating, electrodynamic coating, electrospraying, electrospinning, spin coating, blade coating, die coating, gravure coating, micro-gravure coating, comma coating, roll coating, dip coating, or spray coating.

Any binder and conductive gent typically used in the art may be used as the binder and the conductive agent used in the negative electrode.

An organic solvent, such as N-methylpyrrolidone (NMP), dimethylformamide (DMF), acetone, and dimethylacetamide, or water may be used as the solvent used for forming the negative electrode. These solvents may be used alone or in a mixture of two or more thereof. An amount of the solvent used may be sufficient if the solvent may dissolve and disperse the negative electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with lithium (Li), sodium (Na), or calcium (Ca), or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

According to an embodiment of the present invention, the negative electrode may further comprise a thickener for viscosity control. The thickener may be a cellulose-based compound, and, for example, the thickener may comprise at least one selected from the group consisting of carboxymethyl cellulose (CMC), hydroxy methyl cellulose, hydroxy ethyl cellulose, and hydroxy propyl cellulose, and may particularly comprise CMC. The negative electrode active material and binder as well as the thickener may be dispersed in water to be used in the negative electrode.

The present invention provides a lithium secondary battery comprising the negative electrode for a lithium secondary battery. The lithium secondary battery may comprise the negative electrode, a positive electrode, and a separator disposed between the positive electrode and the negative electrode.

In the negative electrode for a lithium secondary battery, the lithium in the lithium metal layer diffuses into the negative electrode active material layer through pre-lithiation, and accordingly, the lithium secondary battery may comprise the negative electrode for a lithium secondary battery which comprises the lithium diffused into the negative electrode active material layer through the pre-lithiation.

Since the lithium diffused into the negative electrode active material layer and the metal oxide included in the stabilizing layer are respectively inherited from the lithium and the metal oxide which are included in the lithium metal layer, the lithium and the metal oxide may be included in a weight ratio of 50:50 to 99:1, particularly 80:20 to 95:5, and more particularly 87:13 to 92:8. The stabilizing layer may have the effect of stabilizing charge and discharge on the surface of the negative electrode.

The positive electrode may be prepared by a typical method known in the art. For example, a binder, a conductive agent, and a dispersant, if necessary, as well as a solvent are mixed with a positive electrode active material and stirred to prepare a slurry, a metal current collector is then coated with the slurry and pressed, and the positive electrode may then be prepared by drying the coated metal current collector.

The metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 μm to 500 μm.

In the method of preparing a lithium secondary battery of the present invention, examples of the positive electrode active material may be lithium cobalt oxide ($LiCoO_2$); lithium nickel oxide ($LiNiO_2$); $Li[Ni_aCo_bMn_cM^1_d]O_2$ (where $M^1$ is at least one element selected from the group consisting of aluminum (Al), gallium (Ga), and indium (In), $0.3 \leq a < 1.0$, $0 \leq b \leq 0.5$, $0 \leq c \leq 0.5$, $0 \leq d \leq 0.1$, and $a+b+c+d=1$); a layered compound, such as $Li(Li_eM^2_{f-e-f}M^3_{f'})O_{2-g}Ag_g$ (where $0 \leq e \leq 0.2$, $0.6 \leq f \leq 1$, $0 \leq f' \leq 0.2$, $0 \leq g \leq 0.2$, $M^2$ comprises manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \leq h \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \leq i \leq 0.3$); lithium manganese composite oxide represented by the chemical formula $LiMn_{2-j}M^5_jO_2$ (where $M^5$=Co, Ni, Fe, Cr, Zn, or tantalum (Ta), and $0.01 \leq j \leq 0.1$) or $Li_2Mn_3M^6O_8$ (where $M^6$=Fe, Co, Ni, Cu, or Zn); $LiMn_2O_4$ having a part of Li being substituted with alkaline earth metal ions; a disulfide compound; $LiFe_3O_4$, or $Fe_2(MoO_4)_3$, but the positive electrode active material is not limited thereto.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with Li, Na, or Ca, or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

An aqueous dispersant or an organic dispersant, such as N-methyl-2-pyrrolidone, may be used as the dispersant.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may comprise an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery, but the present invention is not limited thereto.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells.

EXAMPLES

Hereinafter, the present invention will be described in detail, according to examples and experimental examples, but the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1

<Preparation of Negative Electrode>

A negative electrode mixture slurry was prepared by adding 92 wt % of a mixture of graphite and SiO (graphite:SiO=7:3), as a negative electrode active material, 3 wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

<Pre-Lithiation Using Acrylic Adhesive>

After LiPAA (lithium polyacrylate) dissolved in NMP (N-methyl-2-pyrrolidone) was coated on the negative electrode prepared above to a thickness of 300 nm, a mixture, in which lithium metal in the form of powder having a diameter of 2 μm and $Al_2O_3$ were mixed in tetrahydrofuran (THF) in a weight ratio of 90:10, was coated thereon to a thickness of 4 μm using a blade and bonded by being pressed with a force of 1 kgf/cm². The anode having a lithium metal layer thus formed thereon was subjected to a natural pre-lithiation process by being left standing for 10 hours.

<Preparation of Lithium Secondary Battery>

A Li metal foil (150 μm) was used as a counter electrode, a polyolefin separator was disposed between the negative electrode and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Example 2

A negative electrode was prepared, pre-lithiation was performed, and a coin-type half cell was then prepared in the same manner as in Example 1 except that lithium metal in the form of powder and $Al_2O_3$ were mixed in a weight ratio of 80:20 in the pre-lithiation process using an acrylic adhesive in Example 1.

Example 3

A negative electrode was prepared, pre-lithiation was performed, and a coin-type half cell was then prepared in the same manner as in Example 1 except that lithium metal in the form of powder and $Al_2O_3$ were mixed in a weight ratio of 95:5 in the pre-lithiation process using an acrylic adhesive in Example 1.

Example 4

A negative electrode was prepared, pre-lithiation was performed, and a coin-type half cell was then prepared in the same manner as in Example 1 except that lithium metal in the form of powder and $Al_2O_3$ were mixed in a weight ratio of 60:40 in the pre-lithiation process using an acrylic adhesive in Example 1.

Example 5

A negative electrode was prepared, pre-lithiation was performed, and a coin-type half cell was then prepared in the same manner as in Example 1 except that lithium metal in the form of powder and $TiO_2$ were mixed in a weight ratio of 60:40 in the pre-lithiation process using an acrylic adhesive in Example 1.

Example 6

<Pre-Lithiation Using Carboxymethyl Cellulose (CMC) Adhesive>

After carboxymethyl cellulose (CMC) dissolved in NMP (N-methyl-2-pyrrolidone) was coated on the negative electrode prepared in Example 1 to a thickness of 300 nm, a mixture, in which lithium metal in the form of powder having a diameter of 2 μm and $Al_2O_3$ were mixed in tetrahydrofuran (THF) in a weight ratio of 90:10, was coated thereon to a thickness of 4 μm using a blade and bonded by being pressed with a force of kgf/cm². The anode having a lithium metal layer thus formed thereon was subjected to a natural pre-lithiation process by being left standing for 10 hours.

<Preparation of Lithium Secondary Battery>

A coin-type half cell was prepared in the same manner as in Example 1 except that the negative electrode subjected to the pre-lithiation using the carboxymethyl cellulose (CMC) adhesive was used as a negative electrode.

Comparative Example 1

<Preparation of Negative Electrode>

A negative electrode mixture slurry was prepared by adding 92 wt % of a mixture of graphite and SiO (graphite:SiO=7:3), as a negative electrode active material, 3 wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

<Preparation of Lithium Secondary Battery>

A Li metal foil (150 μm) was used as a counter electrode, a polyolefin separator was disposed between the negative electrode and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Comparative Example 2

<Preparation of Negative Electrode>

A negative electrode mixture slurry was prepared by adding 92 wt % of a mixture of graphite and SiO (graphite:SiO=7:3), as a negative electrode active material, 3 wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

<Pre-Lithiation Using Acrylic Adhesive>

After LiPAA (lithium polyacrylate) dissolved in NMP (N-methyl-2-pyrrolidone) was coated on the negative electrode prepared above to a thickness of 300 nm, a lithium foil (thickness of 4 μm) was bonded by being pressed with a force of 1 kgf/cm². The anode having the lithium foil thus attached thereto was subjected to a natural pre-lithiation process by being left standing for 10 hours.

<Preparation of Lithium Secondary Battery>

A Li metal foil (150 μm) was used as a counter electrode, a polyolefin separator was disposed between the negative electrode and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Comparative Example 3

<Pre-Lithiation Using Carboxymethyl Cellulose (CMC) Adhesive>

After carboxymethyl cellulose (CMC) dissolved in NMP (N-methyl-2-pyrrolidone) was coated on the negative electrode prepared in Example 1 to a thickness of 300 nm, a lithium foil (thickness of 4 μm) was bonded by being pressed with a force of 1 kgf/cm². The anode having the lithium foil thus attached thereto was subjected to a natural pre-lithiation process by being left standing for 10 hours.

<Preparation of Lithium Secondary Battery>

A coin-type half cell was prepared in the same manner as in Example 1 except that the negative electrode subjected to the pre-lithiation using the carboxymethyl cellulose (CMC) adhesive was used as a negative electrode.

Comparative Example 4

<Pre-Lithiation Using Lithium Metal in the Form of Powder and Acrylic Adhesive>

After LiPAA (lithium polyacrylate) dissolved in NMP (N-methyl-2-pyrrolidone) was coated on the negative electrode prepared in Example 1 to a thickness of 300 nm, lithium metal in the form of powder having a diameter of 2 μm was coated thereon to a thickness of 4 μm using a blade and bonded by being pressed with a force of 1 kgf/cm². The anode having the lithium metal thus attached thereto was subjected to a natural pre-lithiation process by being left standing for 10 hours.

<Preparation of Lithium Secondary Battery>

A coin-type half cell was prepared in the same manner as in Example 1 except that the negative electrode subjected to the pre-lithiation using the lithium metal in the form of powder was used as a negative electrode.

Comparative Example 5

A negative electrode was prepared, pre-lithiation was performed, and a coin-type half cell was then prepared in the same manner as in Example 1 except that lithium metal in the form of powder and $Al_2O_3$ were mixed in a weight ratio of 45:55 in the pre-lithiation process using an acrylic adhesive in Example 1.

Experimental Example 1: First Cycle Charge/Discharge Test

Charge/discharge reversibility test was performed on the coin-type half cells prepared in Examples 1 to 6 and Comparative Examples 1 to 5 using an electrochemical charger/discharger. The coin-type half cells were charged by applying a current at a current density of 0.1 C-rate to a voltage of 0.005 V (vs. Li/Li⁺) during first cycle charge and discharged at the same current density to a voltage of 1.5 V (vs. Li/Li⁺) during discharge. In this case, charge capacity and discharge capacity were measured and the results thereof are presented in Table 1 below.

Initial efficiency (%)=(discharge capacity after the $1^{st}$ discharge/$1^{st}$ charge capacity)×100

Also, $100^{th}$ cycle capacity retention was measured and presented in Table 1 below.

$100^{th}$ cycle capacity retention=(discharge capacity in the $100^{th}$ cycle/discharge capacity in the first cycle)×100

TABLE 1

|  | Initial efficiency (%) | 100$^{th}$ cycle capacity retention (%) |
|---|---|---|
| Example 1 | 107 | 89 |
| Example 2 | 105 | 88 |
| Example 3 | 105 | 86 |
| Example 4 | 101 | 83 |
| Example 5 | 100 | 81 |
| Example 6 | 84 | 78 |
| Comparative Example 1 | 69 | 51 |
| Comparative Example 2 | 98 | 71 |
| Comparative Example 3 | 75 | 65 |
| Comparative Example 4 | 93 | 69 |
| Comparative Example 5 | 87 | 66 |

Examples 1 to 6 were the negative electrodes in which the adhesive layer was disposed on the negative electrode active material layer and the lithium metal layer comprising lithium and metal oxide in a weight ratio of 50:50 to 99:1 was disposed on the adhesive layer, wherein, referring to Table 1, it may be confirmed that Examples 1 to 5 had excellent initial efficiency and 100$^{th}$ cycle capacity retention and Example 6 had excellent 100$^{th}$ cycle capacity retention. The negative electrodes of Examples 1 to 6 had significantly improved initial efficiency and 100$^{th}$ cycle capacity retention in comparison to the negative electrode of Comparative Example 1 in the form of a conventional negative electrode in which a separate lithium metal layer was not formed on the negative electrode active material layer.

With respect to Examples 1 to 5, since the adhesive layer included LiPAA, Examples 1 to 5 had better initial efficiency and 100$^{th}$ cycle capacity retention than Example 6 in which the adhesive layer included carboxymethyl cellulose (CMC), but the fact that the adhesive layer included LiPAA did not lead to an improvement in the initial efficiency and 100$^{th}$ cycle capacity retention. With respect to Comparative Examples 2, 4, and 5 in which the adhesive layer also included LiPAA, both initial efficiency and 100$^{th}$ cycle capacity retention were poorer than those of Examples 1 to 5, and the 100$^{th}$ cycle capacity retentions were significantly inferior to that of Example 6 in which the adhesive layer included CMC.

Specifically, Comparative Examples 2 and 4 were respectively the negative electrodes in which the lithium metal layers, which respectively included the lithium foil and the lithium metal in the form of powder and did not comprise a separate metal oxide, were formed, both initial efficiency and 100$^{th}$ cycle capacity retention were poorer than those of Examples 1 to 5 in which the lithium metal layer included the metal oxide together. The reason for this is that, since the metal oxide played a role in stabilizing charge and discharge on the surface of the negative electrode when an appropriate amount of the metal oxide was present, the metal oxide improved cycle performance. Also, with respect to Comparative Example 5 which included the lithium metal in the form of powder and Al$_2$O$_3$ as in Example 1, but the lithium metal in the form of powder and Al$_2$O$_3$ were included in a weight ratio of 45:55, both initial efficiency and 100$^{th}$ cycle capacity retention were poorer than even those of Comparative Examples 2 and 4 as well as those of Examples 1 to 5. The reason for this is that, since the metal oxide blocked passage of lithium ions when an excessive amount of the metal oxide was used, the metal oxide adversely affected the initial efficiency and the cycle retention.

With respect to Comparative Example 3, there was an effect of improving the initial efficiency and the 100$^{th}$ cycle capacity retention in comparison to Comparative Example 1, but a degree of improvement was insufficient in comparison to Comparative Examples 2, 4, and 5, and the degree of improvement was highly insufficient especially in terms of initial efficiency. From these results, in a case in which the adhesive layer was a polymer of acrylic monomers such as LiPAA, it may be confirmed that a better effect in terms of initial efficiency may be obtained.

The invention claimed is:

1. A negative electrode for a lithium secondary battery, the negative electrode comprising:
   a negative electrode collector;
   a negative electrode active material layer formed on the negative electrode collector; and
   a lithium metal layer,
   wherein an adhesive layer is disposed between the negative electrode active material layer and the lithium metal layer,
   wherein the negative electrode active material layer comprises at least one selected from the group consisting of silicon (Si), silicon oxide particles (SiO$_x$, 0<x≤2), a Si-metal alloy, and an alloy of Si and silicon oxide particles (SiO$_x$, 0<x≤2),
   wherein the lithium metal layer comprises lithium and metal oxide in a weight ratio of 60:40 to 95:5,
   wherein the metal oxide comprises at least one selected from the group consisting of titanium oxide, aluminum oxide, chromium trioxide, zirconium dioxide, and tantalum pentoxide, and
   wherein the adhesive layer comprises lithium polyacrylate.

2. The negative electrode for a lithium secondary battery of claim 1, wherein the lithium metal layer has a thickness of 1,000 nm to 10,000 nm.

3. The negative electrode for a lithium secondary battery of claim 1, wherein the adhesive layer has a thickness of 100 nm to 10,000 nm.

4. A negative electrode for a secondary battery, the negative electrode comprising:
   a negative electrode collector;
   a negative electrode active material layer formed on the negative electrode collector; and
   a stabilizing layer comprising a metal oxide,
   wherein an adhesive layer is disposed between the negative electrode active material layer and the stabilizing layer,
   wherein the metal oxide comprises at least one selected from the group consisting of titanium oxide, aluminum oxide, chromium trioxide, zirconium dioxide, and tantalum pentoxide,
   wherein the negative electrode active material layer comprises at least one selected from the group consisting of silicon (Si), silicon oxide particles (SiOx, 0<x≤2), a Si-metal alloy, and an alloy of Si and silicon oxide particles (SiOx, 0<x≤2),
   wherein the negative electrode active material layer comprises lithium which is diffused through pre-lithiation from the stabilizing layer,
   wherein the lithium diffused into the negative electrode active material layer and the metal oxide included in the stabilizing layer have a weight ratio of 60:40 to 95:5, and
   wherein the adhesive layer comprises lithium polyacrylate.

5. A lithium secondary battery comprising the negative electrode for a secondary battery of claim 4.

* * * * *